US011440265B2

(12) United States Patent
Hofmann

(10) Patent No.: US 11,440,265 B2
(45) Date of Patent: Sep. 13, 2022

(54) METHOD FOR THE ADDITIVE PRODUCTION OF A THREE-DIMENSIONAL OBJECT

(71) Applicant: CL SCHUTZRECHTSVERWALTUNGS GMBH, Lichtenfels (DE)

(72) Inventor: Matthias Hofmann, Lichtenfels (DE)

(73) Assignee: CONCEPT LASER GMBH, Lichtenfels (DE)

( * ) Notice: Subject to any disclaimer, the term of this patent is extended or adjusted under 35 U.S.C. 154(b) by 282 days.

(21) Appl. No.: 15/840,173

(22) Filed: Dec. 13, 2017

(65) Prior Publication Data
US 2018/0162059 A1    Jun. 14, 2018

(30) Foreign Application Priority Data

Dec. 14, 2016  (DE) .......................... 102016124401.5

(51) Int. Cl.
| | |
|---|---|
| *B29C 64/40* | (2017.01) |
| *B29C 64/153* | (2017.01) |
| *B33Y 10/00* | (2015.01) |
| *B33Y 70/00* | (2020.01) |
| *B22F 10/20* | (2021.01) |

(52) U.S. Cl.
CPC .............. *B29C 64/40* (2017.08); *B22F 10/20* (2021.01); *B29C 64/153* (2017.08); *B33Y 10/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 5,897,825 A | 4/1999 | Fruth et al. | |
| 2004/0099983 A1 | 5/2004 | Dirscherl | |
| 2013/0277891 A1* | 10/2013 | Teulet | B22F 3/1055 |
| | | | 264/497 |

FOREIGN PATENT DOCUMENTS

| | | | | |
|---|---|---|---|---|
| DE | 19538257 A1 | 4/1996 | | |
| DE | 10042132 A1 * | 3/2002 | ......... | B29C 35/0288 |
| DE | 102007033434 A1 | 1/2009 | | |

(Continued)

OTHER PUBLICATIONS

Machine English translation of DE 10042132, Accessed Feb. 4, 2021 (Year: 2002).*

(Continued)

*Primary Examiner* — Francisco W Tschen
*Assistant Examiner* — Adrianna N Konves
(74) *Attorney, Agent, or Firm* — Dority & Manning, P.A.

(57) ABSTRACT

Method for the additive production of a three-dimensional object (2) by selective exposure in successive layers and associated selective consolidation in successive layers of construction material layers composed of a construction material (3) that can be consolidated by means of an energy beam (4), wherein, as part of the additive production of the three-dimensional object (2) to be produced additively, a supporting structure (11) directly surrounding the three-dimensional object (2) produced or to be produced additively is formed by selective exposure in successive layers and associated selective pre-consolidation in successive layers of construction material layers composed of the construction material (3) that can be consolidated by means of the energy beam (4).

20 Claims, 2 Drawing Sheets

(56) References Cited

FOREIGN PATENT DOCUMENTS

| | | |
|---|---|---|
| FR | 2974316 A1 | 10/2012 |
| GB | 2520596 A | 5/2015 |
| JP | H09511705 A | 11/1997 |
| JP | 2004/004018 A | 1/2004 |
| JP | 2013/516387 A | 5/2013 |
| JP | 2016/113701 A | 6/2016 |
| JP | 2016/198958 A | 12/2016 |
| JP | 2017106116 A | 6/2017 |

OTHER PUBLICATIONS

Eezitec, 3D Printing Education: Removing Support Structure | Eezitec; https://www.youtube.com/watch?v=dxOV4OAifzY, Accessed Dec. 13, 2021 (Year: 2015).*

Gebhardt et al., Additive Manufacturing by selective laser melting the realizer desktop machine and its application for the dental industry, Physics Procedia, vol. 5, Part B, 2010, pp. 543-549, ISSN 1875-3892, (https://www.sciencedirect.com/science/article/pii/S1875389210005080). (Year: 2010).*

Chinese Office Action Corresponding to Application No. 20170651141.3 dated Jul. 1, 2019.

European Search Report Corresponding to Application No. 17178987 dated Jan. 17, 2018.

European Search Opinion Corresponding to Application No. 17178987.8 dated Jan. 29, 2018.

German Search Results Corresponding to Application No. 102016124401.5 dated Jan. 11, 2019.

Japanese Office Action Corresponding to Application No. 2017207798 dated Oct. 15, 2018.

Machine Translated Japanese Search Report Corresponding to Application No. 2019189866 dated Oct. 8, 2020.

Jamasp Jhabvala et al., "An innovative method to build support structures with a pulsed laser in the selective laser melting process," The International Journal Of Advanced Manufacturing Technology, Springer, Berlin, DE Bd. 59, Nr. 1-4. 7. Jul. 7, 2011, pp. 137-142.

Rescic Silvia et al., "The micro-sandblasting technique as a new tool for the evaluation of the state of conservation of natural stone and mortar surfaces", European Journal Of Environmental And Civil Engineering, Bd. 17, Nr. 2, 20. Feb. 20, 2013, pp. 113-127.

* cited by examiner

METHOD FOR THE ADDITIVE PRODUCTION OF A THREE-DIMENSIONAL OBJECT

The invention relates to a method for the additive production of a three-dimensional object by selective exposure in successive layers and associated selective consolidation in successive layers of construction material layers composed of a construction material that can be consolidated by means of an energy beam.

Corresponding methods for the additive production of three-dimensional objects are fundamentally known. One known example of a corresponding method is a selective laser melting method, or SLM method for short.

In the context of carrying out corresponding methods, the formation of supporting structures is furthermore known. Corresponding supporting structures are distinguished by a supporting effect for respective three-dimensional objects produced or to be produced additively, and typically comprise a multiplicity of strut-type or -shaped supporting elements. Consequently, respective three-dimensional objects produced or to be produced additively are supported by corresponding supporting structures. After completion of the additive construction process, corresponding supporting structures are typically removed from the respective additively produced three-dimensional object.

Particularly in the additive production of three-dimensional objects with a delicate or complex geometrical/design configuration, it has hitherto been difficult to form supporting structures which, on the one hand, have an adequate supporting effect, even in regions of a respective three-dimensional object which are difficult to access, e.g. undercut regions, and which, on the other hand, can be removed without damaging the respective three-dimensional object.

It is the underlying object of the invention to specify a method for the additive production of a three-dimensional object which is improved particularly in respect of the implementation of a better supporting structure than the above.

The object is achieved by a method for the additive production of a three-dimensional object in accordance with claim 1. The associated dependent claims relate to possible embodiments of the method. The object is furthermore achieved by a device in accordance with claim 10.

The method described herein is used for the additive production of three-dimensional objects, that is to say, for example, of engineering components or engineering component modules, by selective exposure in successive layers and associated selective consolidation in successive layers of construction material layers composed of a construction material that can be consolidated. The construction material can be a particulate or pulverulent metal, plastics and/or ceramic material. The selective exposure or consolidation in successive layers of respective construction material layers to be selectively consolidated is performed on the basis of object-related construction data. Corresponding construction data describe the geometrical/design configuration of the respective object to be produced additively and can, for example, contain "sliced" CAD data of the object to be produced additively. The method can be implemented as a selective laser melting method (SLM method) or as a selective laser sintering method (SLS method), for example.

According to the method, additive production of a respective three-dimensional object to be produced additively—the term "object" is used below for short—includes not only the additive build-up or additive formation of a respective object that is actually to be produced but also the additive build-up or additive formation of a supporting structure. The supporting structure supports a respective object at least in some section or sections; thus, the supporting structure exerts a supporting effect acting on a respective object, at least in some section or sections.

The supporting structure formed in accordance with the method surrounds a respective object, i.e. individual, several or all object sections of the respective object directly. In other words, at least some section or sections of the respective object, in particular all of the respective object, is/are embedded in the supporting structure. Accordingly, there is at least sectional, in particular complete, direct mechanical contact between the supporting structure and the respective object supported or to be supported.

At the same time, it is conceivable that the supporting structure surrounds the respective object at least in some section or sections, e.g. by means of a plurality of interconnected or a plurality of non-interconnected supporting structure sections, or that the supporting structure completely surrounds the respective object, e.g. by means of a plurality of interconnected or a plurality of non-interconnected supporting structure sections. Accordingly, the supporting structure can be formed by a plurality of interconnected or a plurality of non-interconnected supporting structure sections or can comprise a plurality of interconnected or a plurality of non-interconnected supporting structure sections. Corresponding supporting structure sections each extend along at least some section or sections of the respective object, surrounding the latter in each case at least in some section or sections.

As mentioned, the supporting structure is formed as part of the additive production of the respective object. According to the method, the supporting structure is formed by selective exposure in successive layers and associated selective pre-consolidation in successive layers of construction material layers composed of the construction material that can be consolidated by means of the energy beam. The selective exposure or pre-consolidation in successive layers of respective construction material layers to be selectively consolidated is performed on the basis of construction data related to the supporting structure. Corresponding construction data describe the geometrical/design configuration of the respective supporting structure to be produced additively and can, for example, contain "sliced" CAD data of the supporting structure to be produced additively.

The essential point is that the formation of the supporting structure is accomplished by pre-consolidation of the construction material. Pre-consolidation should be taken to mean (relatively) slight consolidation of the construction material, particularly in comparison with the consolidation of the construction material to form the actual object to be produced. Thus, the pre-consolidation implemented to form the supporting structure differs from the consolidation implemented to form a respective object that is actually to be produced in the degree of consolidation achieved. To form the supporting structure, the construction material is consolidated (significantly) less—as will be apparent below, complete melting of the construction material typically does not take place here—than for the formation of the respective object that is actually to be produced, it being possible to achieve this, for example, by using different exposure units, that is to say, in particular, exposure units of different power, and/or different exposure parameters, in particular through a lower intensity of exposure, shorter exposure time etc. The different degrees of consolidation also result in different structural, that is to say, in particular, mechanical, properties between the supporting structure and the actual object to be produced; typically, the supporting structure has a (significantly) lower density and a (significantly) lower strength than the object, for example.

Owing to the fact that the supporting structure directly surrounds the respective object (at least in some section or sections) or the respective object is embedded (at least in some section or sections) (with an accurate fit) in the supporting structure, the supporting structure has an adequate supporting effect even in regions of the respective object which are difficult to access, e.g. undercut regions (where present). By virtue of the fact that the supporting structure is formed by pre-consolidation of the construction material, it can be removed from the respective object without problems, that is to say, in particular, without damaging the respective object. Overall, an improved method for the additive production of three-dimensional objects is thus available.

It has been mentioned that the pre-consolidation to form the supporting structure differs from the consolidation to form the actual object to be produced in the respectively achieved degree of consolidation. The selective consolidation of the construction material in successive layers to form a respective object is typically performed with a first degree of consolidation of the construction material, and the selective pre-consolidation of the construction material in successive layers to form the supporting structure is performed with a second degree of consolidation of the construction material situated below the first degree of consolidation. The second degree of consolidation selected is typically low, with the result that the supporting structure can be removed from the respective object without problems, that is to say, in particular, without damaging the respective object. In particular, the second degree of consolidation selected can be so low that the supporting structure can be removed from the respective object by hand or crumbles spontaneously during a process of unpacking the respective object.

To be specific, the supporting structure can be designed to be porous at least in some section or sections, in particular completely porous, i.e. to have a certain porosity. In general, a porous design of the supporting structure should be taken to mean any finely divided structure which, by virtue of its finely divided structure, can be removed from a respective object without damaging the respective object, that is to say, for example, even a sponge structure.

In particular, the selective consolidation of the construction material in successive layers to form the object can be performed by complete melting (and subsequent cooling) of the construction material. Thus, the selective consolidation of the construction material in successive layers to form the object is typically performed by selective introduction of radiant energy, which heats the construction material to a temperature above the melting temperature thereof, with the result that the construction material is melted and a phase transition (solid-liquid) takes place. In contrast, the selective pre-consolidation of the construction material in successive layers to form the supporting structure is typically not performed by (complete) melting (and subsequent cooling) of the construction material. The selective pre-consolidation of the construction material in successive layers to form the supporting structure is typically performed by selective introduction of radiant energy, which heats the construction material to a temperature below the melting temperature thereof, with the result that the construction material is not melted and no phase transition (solid-liquid) takes place. By means of the selective pre-consolidation in successive layers, a sintered joint between adjacent construction material particles, formed by the formation of a sintered neck between adjacent construction material particles, may be formed. However, the construction material does not undergo any phase transition during this process.

In order to surround the objects produced or to be produced, in particular completely, the supporting structure can be formed with a geometrical shape that (completely) surrounds the object produced or to be produced. In particular, the geometrical shape of the supporting structure should be selected according to the geometrical shape of the object produced or to be produced and of the degree of encirclement, i.e. the degree to which the supporting structure is supposed to surround the object. Accordingly, mention is made of the fact, purely by way of example, that the supporting structure can be formed with a cuboid-type or cuboid-shaped, possibly cube-type or cube-shaped, or a sphere-type or sphere-shaped geometrical shape. Of course, the supporting structure can also be formed in free geometrical shapes, that is to say, in particular, without a clearly defined geometry.

Thus, for example, it is possible for the supporting structure to be formed with a geometrical shape which follows the contour, in particular the outer and/or inner contour, of the respective object produced or to be produced. Thus—apart from a certain allowance—the geometrical shape of the supporting structure which follows the contour of the object corresponds substantially to the geometrical shape of the respective object produced or to be produced. By virtue of the fact that the supporting structure is formed with a geometrical shape which follows the contour of the respective object produced or to be produced, the quantity of construction material used to form the supporting structure can be kept relatively small.

It has been mentioned that the selective exposure or consolidation in successive layers of respective construction material layers to be selectively consolidated to form respective objects is performed on the basis of object-related construction data. It has furthermore been mentioned that the selective exposure or pre-consolidation in successive layers of respective construction material layers to be selectively consolidated to form the supporting structure is performed on the basis of construction data related to the supporting structure. In order to keep down the effort, in particular the computational effort, to produce the construction data related to the supporting structure, the construction data related to the supporting structure can be produced on the basis of respective object-related construction data. This likewise ensures that the supporting structure or the supporting effect is in each case produced while taking into account the geometrical shape of the respective object (section) to be supported.

The invention furthermore relates to a device for the additive production of three-dimensional objects by selective exposure in successive layers and associated selective consolidation in successive layers of construction material layers composed of a construction material that can be consolidated by means of an energy beam. The device can be designed, for example, as an SLM device, i.e. as a device for carrying out selective laser melting methods (SLM methods), or as an SLS device, i.e. as a device for carrying out selective laser sintering methods (SLS methods). The device is distinguished by the fact that it is designed to carry out the method described. Consequently, all the statements made in connection with the method apply analogously to the device.

The device comprises the functional components typically required to carry out additive construction processes. These include, in particular, a coating unit, which is designed to form construction material layers to be selectively consolidated (in the construction plane of the device), and an exposure unit, which is designed for the selective exposure of construction material layers to be selectively consolidated (in the construction plane of the device). The coating unit typically comprises a plurality of constituent parts, that is to say, for example, a coating element comprising a coating tool, in particular a blade-shaped coating tool, and a guiding unit for guiding the coating element along a defined path of motion. The exposure unit also typically comprises a plurality of constituent parts, that is to say, for example, a beam generating unit for generating an energy or laser beam, a beam deflection unit (scanner unit) for deflecting an energy or laser beam generated by the beam generating unit onto a region to be exposed of a construction material layer to be selectively consolidated, and various optical elements, e.g. lens elements, objective elements etc.

The invention is explained in greater detail by means of illustrative embodiments in the figures of the drawing. In the drawing:

FIG. 1 shows a diagrammatic illustration of a device 1 according to one illustrative embodiment.

The device 1 is used for the additive production of three-dimensional objects 2, that is to say, in particular, engineering components or technical component modules, by selective exposure in successive layers and associated selective consolidation in successive layers of construction material layers composed of a construction material 3 that can be consolidated, that is to say, for example, a metal powder, by means of an energy or laser beam 4. The device 1 can be designed as a laser CUSING® device, i.e. as a device for carrying out selective laser melting methods.

Figure 1:
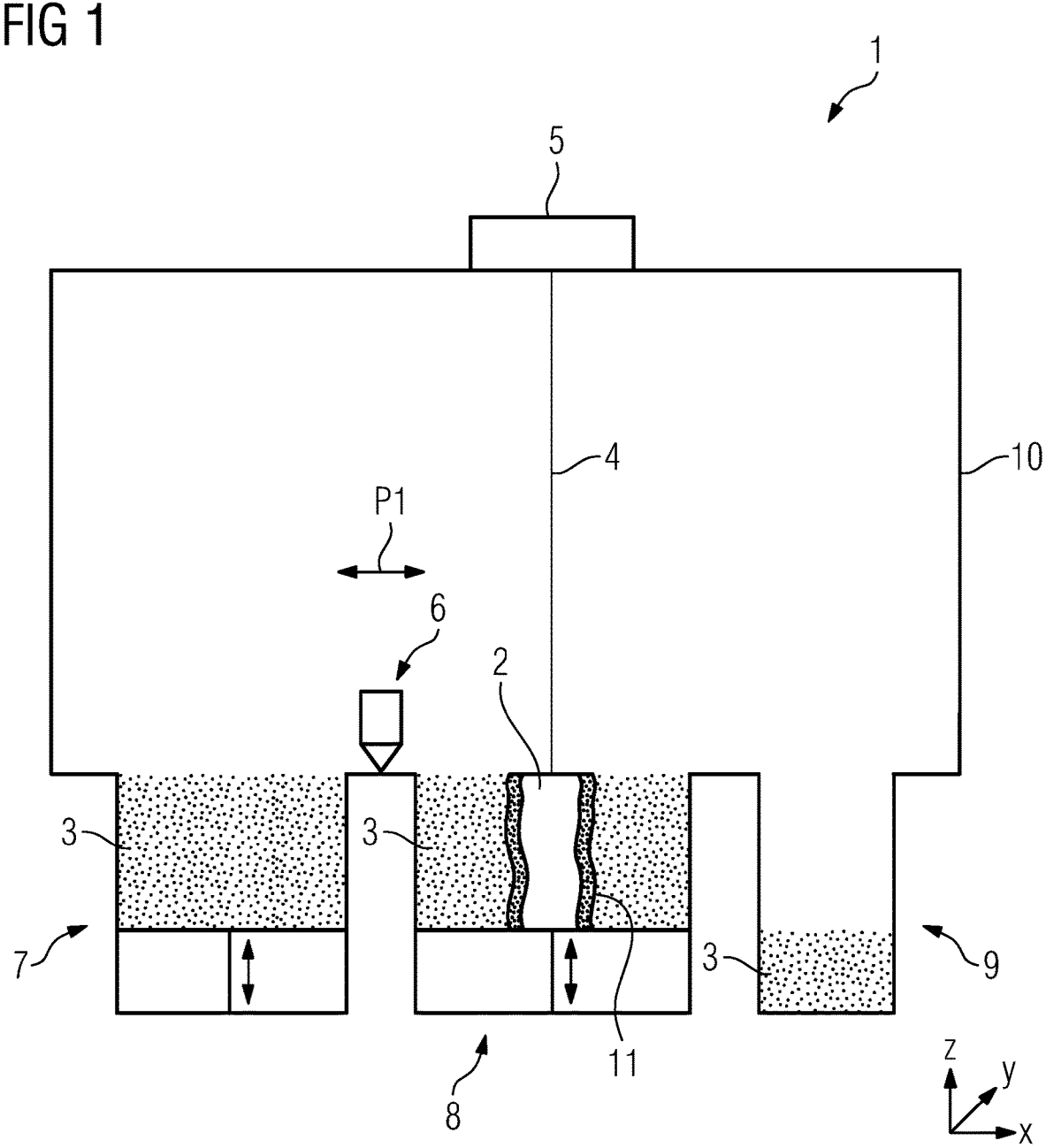
FIG. 1 shows a diagrammatic illustration of a device according to one illustrative embodiment.

The device 1 comprises the functional components required to carry out additive construction processes; in FIG. 1, for example, a coating unit 5 and an exposure unit 6 are shown.

The coating unit 5 is designed for the formation, in a construction plane of the device 1, of construction material layers to be selectively exposed or selectively consolidated. The coating unit 5 comprises a coater element subassembly (not denoted specifically) comprising a plurality of coater elements (not shown), which is supported by means of a guiding unit (not shown) in such a way as to be movable in a horizontal direction, as indicated by the double arrow P1.

The exposure unit 6 is designed for the selective exposure of construction material layers to be selectively consolidated in the construction plane of the device 1 and, for this purpose, comprises a beam generating unit (not shown), which is designed to generate a laser beam 4, optionally a beam deflection unit (not shown), which is designed to deflect a laser beam 4 generated by the beam generating unit onto a region to be exposed of a construction material layer to be selectively consolidated, and various optical elements, e.g. filter elements, objective elements, lens elements etc.

Also shown in FIG. 1 are a dosing module 7, a construction module 8 and an overflow module 9, which are docked to a lower region of an inertizable process chamber 10 of the device 1. Said modules can also form a lower region of the process chamber 10.

By means of the device 1, it is possible to implement a method for the additive production of three-dimensional objects 2 by selective exposure in successive layers and associated selective consolidation in successive layers of construction material layers composed of a construction material 3 that can be consolidated. The selective exposure or consolidation in successive layers of respective construction material layers to be selectively consolidated is performed on the basis of object-related construction data. Corresponding construction data describe the geometrical/design configuration of the respective object 2 to be produced additively and can, for example, contain "sliced" CAD data of the object 2 to be produced additively. The method can be a laser CUSING® method, i.e. a selective laser melting method.

According to the method, additive production of a respective three-dimensional object 2 to be produced additively includes not only the additive build-up or additive formation of a respective object 2 that is actually to be produced but also the additive build-up or additive formation of a supporting structure 11. The supporting structure 11 supports the respective object 2 at least in some section or sections; thus, the supporting structure 11 exerts a supporting effect acting on the respective object 2, at least in some section or sections.

Figure 2:
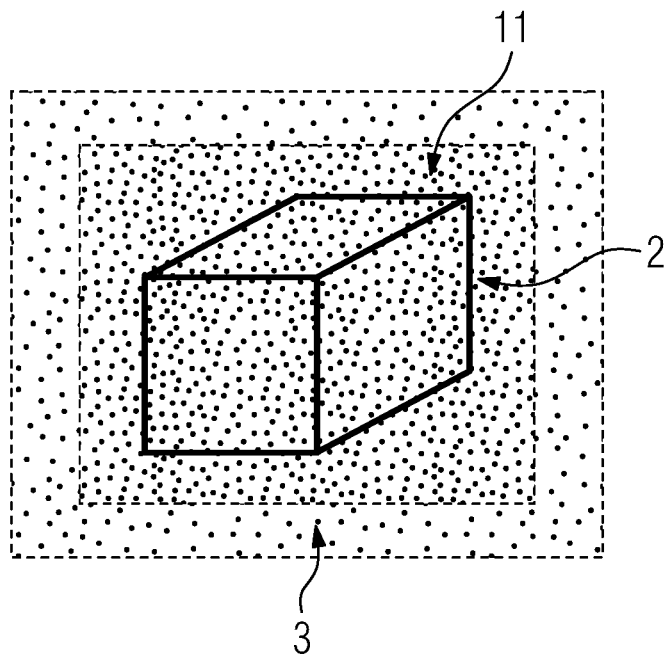
FIGS. 2 and 3 each show a diagrammatic illustration of a supporting structure according to one illustrative embodiment.
Figure 3:
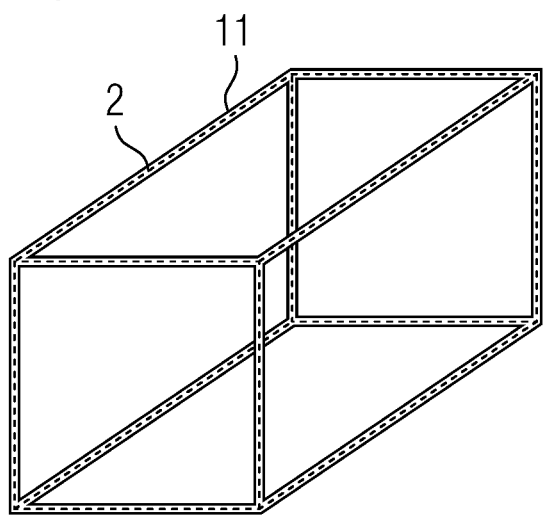

Illustrative embodiments of a supporting structure 11 are shown in a diagrammatic illustration in FIGS. 2 and 3. A delicate cube-type framework structure consisting of individual strut-type object sections arranged or aligned along the edges of an imaginary cube, is shown as an object by way of example in each of FIGS. 2 and 3.

From FIGS. 2 and 3 it can be seen that the supporting structure 11 directly surrounds a respective object 2, i.e. individual, several or all the object sections of the respective object 2. In other words, the object 2 is embedded (with an accurate fit) in the supporting structure 11. Accordingly, there is direct mechanical contact between the supporting structure 11 and the respective object 2 supported or to be supported. For this purpose, the supporting structure 11 can be formed by a plurality of interconnected or a plurality of non-interconnected supporting structure sections or can comprise a plurality of interconnected or a plurality of non-interconnected supporting structure sections. Corresponding supporting structure sections each extend along at least some section or sections of the respective object 2, surrounding the latter in each case at least in some section or sections.

As mentioned, the supporting structure 11 is formed as part of the additive production of the respective object 2. According to the method, the supporting structure 11 is formed by selective exposure in successive layers and associated selective pre-consolidation in successive layers of construction material layers composed of the construction material 3 that can be consolidated by means of the energy beam 4. The selective exposure or pre-consolidation in successive layers of respective construction material layers to be selectively consolidated is performed on the basis of construction data related to the supporting structure. Corresponding construction data describe the geometrical/design configuration of the respective supporting structure to be produced additively and can, for example, contain "sliced" CAD data of the supporting structure 11 to be produced additively. In order to keep down the effort, in particular the computational effort, to produce the construction data related to the supporting structure, the construction data related to the supporting structure can be produced on the basis of respective object-related construction data. This likewise ensures that the supporting structure 11 is in each case produced while taking into account the geometrical shape of the respective object 2 to be supported.

The essential point is that the formation of the supporting structure 11 is accomplished by pre-consolidation of the construction material 3. Pre-consolidation should be taken to mean (relatively) slight consolidation of the construction material 3, particularly in comparison with the consolidation of the construction material 3 to form the actual object 2 to be produced. Thus, the pre-consolidation implemented to form the supporting structure 11 differs from the consolidation implemented to form the object 2 that is actually to be produced in the degree of consolidation achieved. To form the supporting structure 11, the construction material 3 is consolidated (significantly) less than to form the object 2 that is actually to be produced, this being achieved, for example, through the use of different exposure units and/or different exposure parameters, in particular through a lower exposure intensity, shorter exposure time etc. The different degrees of consolidation also result in different structural, that is to say, in particular, mechanical, properties between the supporting structure 11 and the actual object 2 to be produced; the supporting structure 11 has a (significantly) lower density and a (significantly) lower strength than the respective object 2, for example.

The selective consolidation of the construction material 3 in successive layers to form the object 2 is performed with a first degree of consolidation of the construction material 3, and the selective pre-consolidation of the construction material 3 in successive layers to form the supporting structure 11 is performed with a second degree of consolidation of the construction material 3 situated below the first degree of consolidation. The second degree of consolidation selected is low, with the result that the supporting structure 11 can be removed from the object 2 without problems, that is to say, in particular, without damaging the object 2. In particular, the second degree of consolidation selected is so low that the supporting structure 11 can be removed from the object 2 by hand or crumbles spontaneously during a process of unpacking the object 2.

The selective consolidation of the construction material 3 in successive layers to form the object 2 is performed by complete melting (and subsequent cooling) of the construction material 3. Thus, the selective consolidation of the construction material 3 in successive layers to form the object is performed by selective introduction of radiant energy, which heats the construction material 3 to a temperature above the melting temperature thereof, with the result that the construction material 3 is melted. During this process, the construction material 3 undergoes a phase transition. In contrast, the selective pre-consolidation of the construction material 3 in successive layers to form the supporting structure 11 is not performed by (complete) melting (and subsequent cooling) of the construction material 3. The selective pre-consolidation of the construction material 3 in successive layers to form the supporting structure 11 is performed by selective introduction of radiant energy, which heats the construction material 3 to a temperature below the melting temperature thereof, which may allow a sintered joint between adjacent construction material particles, formed by the formation of a sintered neck. However, the construction material 3 does not undergo any phase transition during this process.

To achieve appropriately fragile properties of the supporting structure 11, the supporting structure 11 can be designed to be porous, at least in some section or sections, in particular completely porous, i.e. to have a certain porosity. To be specific, the supporting structure 11 can be designed as a sponge structure ("sponge support").

Owing to the fact that the supporting structure 11 directly surrounds the object 2 or the object 2 is embedded in the supporting structure 11, the supporting structure 11 has an adequate supporting effect even in regions of the object 2 which are difficult to access, e.g. undercut regions (where present). By virtue of the fact that the supporting structure 11 is formed by pre-consolidation of the construction material 3, it can be removed from the object 2 without problems, that is to say, in particular, without damaging the object 2.

In order to surround the objects 2 produced or to be produced, the supporting structure 11 can be formed with a geometrical shape that (completely) surrounds the object 2, as shown in FIG. 2. The geometrical shape of the supporting structure 11 is selected according to the geometrical shape of the object 2 and of the degree of encirclement, i.e. the degree to which the supporting structure 11 is supposed to surround the object 2. In the illustrative embodiment shown in FIG. 2, the supporting structure 11 is formed with a cuboid-type or cuboid-shaped, optionally cube-type or cube-shaped configuration. As can be seen, the object 2 is arranged within the supporting structure 11, and the supporting structure 11 completely surrounds the object 2. In particular, each strut-type object section is directly surrounded by the supporting structure 11.

The same result could be achieved with a supporting structure 11 having a sphere-type or sphere-shaped geometrical configuration, for example. The sphere-type or sphere-shaped geometrical configuration of the supporting structure 11 would be dimensioned in such a way that it completely surrounded the object 2. In principle, the supporting structure 11 can also be formed in free geometrical shapes, that is to say, in particular, without a clearly defined geometry.

In the illustrative embodiment shown in FIG. 3, it is illustrated that the supporting structure 11 can also be formed with a geometrical shape which follows the contour, in particular the outer and/or inner contour, of the object 2. Thus—apart from a certain allowance—the geometrical shape of the supporting structure 11 which follows the contour of the object 2 corresponds substantially to the geometrical shape of the object 2. In the illustrative embodiment shown in FIG. 3, the supporting structure 11 likewise has a geometrical shape of a delicate cube-type framework structure consisting of individual (hollow) strut-type supporting structure sections arranged or aligned along the edges of an imaginary cube. The (hollow) strut-type supporting structure sections completely surround the strut-type object sections respectively associated therewith.

By virtue of the fact that the supporting structure 11 is formed with a geometrical shape which follows the contour of the object 2, the quantity of construction material 3 used to form the supporting structure 11 can be kept relatively small.

The invention claimed is:

1. A method for an additive production of a three-dimensional object by a selective exposure in successive layers and an associated selective consolidation in the successive layers of construction material layers composed of a construction material that can be consolidated with an energy beam, the method comprising:

producing, as part of the additive production of the three-dimensional object to be produced additively, a supporting structure directly surrounding the three-dimensional object the supporting structure produced or to be produced additively is formed by the selective exposure in the successive layers and an associated selective pre-consolidation in the successive layers of the construction material layers composed of the construction material that can be consolidated with the energy beam;

performing the selective consolidation of the construction material in the successive layers to form the three-dimensional object with a first degree of consolidation of the construction material; and performing the selective pre-consolidation of the construction material in the successive layers to form the supporting structure with a second degree of consolidation of the construction material, the second degree of consolidation of the construction material having a lesser degree of consolidation than that of the first degree of consolidation of the construction material;

wherein the selective consolidation of the construction material in the successive layers to form the three-dimensional object is performed by a complete melting and a subsequent cooling of the construction material such that the construction material undergoes a solid-liquid phase transition, and the selective pre-consolidation of the construction material in the successive layers to form the supporting structure is performed by an incomplete melting and/or sintering of the construction material such that the construction material does not undergo the solid-liquid phase transition, resulting in removal of the supporting structure from the three-dimensional object via spontaneous crumbling during a process of unpacking the three-dimensional object.

2. The method according to claim 1, wherein the second degree of consolidation of the construction material results in a supporting structure of a lower strength than that of the three-dimensional object.

3. The method according to claim 1, wherein the supporting structure is porous, at least in some section or sections.

4. The method according to claim 1, wherein the selective pre-consolidation of the construction material in the successive layers to form the supporting structure is performed by a selective introduction of a radiant energy.

5. The method according to claim 1, wherein the supporting structure is formed with a plurality of interconnected or a plurality of non-interconnected supporting structure sections.

6. The method according to claim 1, wherein the supporting structure is formed with a cuboidal geometrical shape surrounding the three-dimensional object produced or to be produced additively, or the supporting structure is formed with a geometrical shape which follows the contour, in particular the outer and/or inner contour, of the three-dimensional object produced or to be produced additively.

7. The method according to claim 1, wherein the supporting structure is formed completely or sectionally surrounding the three-dimensional object produced or to be produced additively.

8. The method according to claim 1, wherein the selective exposure in the successive layers and the associated selective pre-consolidation in the successive layers of the construction material layers composed of the construction material that can be consolidated with the energy beam is performed based on construction data related to the supporting structure, wherein the construction data related to the supporting structure are produced based on object-related construction data.

9. A device for the additive production of the three-dimensional object by the selective exposure in the successive layers and the associated selective consolidation in the successive layers of the construction material layers composed of the construction material that can be consolidated with the energy beam, wherein the device is configured to carry out the method according to one of the preceding claims.

10. The method according to claim 1, wherein the selective pre-consolidation of the construction material heats the construction material to a temperature below the melting temperature of the construction material.

11. The method according to claim 1, wherein the selective consolidation of the construction material in the successive layers to form the three-dimensional object is performed with a first exposure unit, and the selective pre-consolidation of the construction material in the successive layers to form the supporting structure is performed with a second exposure unit having at least one different exposure parameter from that of the first exposure unit.

12. The method according to claim 1, wherein the construction material is a particulate or pulverulent metal, plastics, and/or ceramic material.

13. The method according to claim 8, wherein the construction data contains CAD data of the three-dimensional object.

14. The method according to claim 1, wherein at least some section or sections of the three-dimensional object or all of the three dimensional-object is embedded in the supporting structure.

15. The method according to claim 1, wherein at least sectional or complete direct mechanical contact exists between the three-dimensional object and the supporting structure.

16. The method according to claim 11, wherein the first exposure unit and the second exposure unit differ in power.

17. The method according to claim 11, wherein the at least one different exposure parameter is at least one of an intensity of exposure and a shorter exposure time.

18. The method according to claim 1, wherein the supporting structure has a lower density and a lower strength than that of the three-dimensional object.

19. The device according to claim 9, wherein the device is a selective laser melting device configured for use in selective laser melting methods.

20. The device according to claim 9, wherein the device is a selective laser sintering device configured for use in selective laser sintering methods.

* * * * *